(12) United States Patent
Shabah et al.

(10) Patent No.: US 12,509,208 B2
(45) Date of Patent: Dec. 30, 2025

(54) MODULAR FLYING PLATFORM

(71) Applicant: SOLUTIONS HUMANITAS INC., Montreal (CA)

(72) Inventors: Abdo Shabah, Montreal (CA); Maroua Ben Attia, Montreal (CA); Chuan Pham, Montreal (CA); David Communier, Montreal (CA)

(73) Assignee: SOLUTIONS HUMANITAS INC., Montreal (CA)

( * ) Notice: Subject to any disclaimer, the term of this patent is extended or adjusted under 35 U.S.C. 154(b) by 0 days.

(21) Appl. No.: 18/675,050

(22) Filed: May 27, 2024

(65) Prior Publication Data

US 2024/0391579 A1    Nov. 28, 2024

Related U.S. Application Data

(60) Provisional application No. 63/504,722, filed on May 26, 2023.

(51) Int. Cl.
*B64B 1/08* (2006.01)
*B64C 37/02* (2006.01)
*B64D 5/00* (2006.01)

(52) U.S. Cl.
CPC ............... *B64B 1/08* (2013.01); *B64C 37/02* (2013.01); *B64D 5/00* (2013.01)

(58) Field of Classification Search
CPC .. B64C 1/08; B64C 37/02; B64D 5/00; B64D 1/02
See application file for complete search history.

(56) References Cited

U.S. PATENT DOCUMENTS

| | | | | |
|---|---|---|---|---|
| 2013/0037650 A1* | 2/2013 | Heppe | ..................... | B64C 37/02 244/2 |
| 2015/0336685 A1* | 11/2015 | Wan | ....................... | B64G 1/401 244/2 |
| 2020/0031500 A1* | 1/2020 | Russell | .................. | B64G 1/646 |

FOREIGN PATENT DOCUMENTS

| | | | | |
|---|---|---|---|---|
| RU | 2750558 C2 * | 6/2021 | ............ | B64G 1/005 |
| WO | WO-2017127746 A1 * | 7/2017 | ............... | B64B 1/44 |

OTHER PUBLICATIONS

Machine Translation of RU-2750558, Kozlov Aleksandr Ivanovich, Jun. 29, 2021 (Year: 2021).*

* cited by examiner

*Primary Examiner* — Magdalena Topolski
*Assistant Examiner* — Katherine June Walter
(74) *Attorney, Agent, or Firm* — Benoit Yelle; Lavery, de Billy, L.L.P

(57) ABSTRACT

Modular flying platform including an airship body defining an internal space and configured to achieve buoyancy, an internal structure supporting a transfer channel, an attachment mechanism positioned on the transfer channel to detachably connect with a second platform. The transfer channel is configured to permit transfer therethrough of a payload between the flying platforms when securely connected. A chain of modular flying platforms with one or more motors mounted to the airship body to control motion thereof. A method for managing a chain of modular flying platforms includes deploying a plurality of platforms, connecting the platforms to form the chain, transferring a payload through channels of the connected platforms and distributing at least one of propulsion, electrical power and computing across the chain.

17 Claims, 7 Drawing Sheets

MODULAR FLYING PLATFORM

PRIORITY STATEMENT

This non-provisional patent application claims priority based upon the prior U.S. provisional patent application entitled "MODULAR FLYING PLATFORM", application No. 63/504,722, filed on 2023 May 26, in the name of SOLUTIONS HUMANITAS INC., which is herein incorporated by reference in its entirety.

TECHNICAL FIELD

The present invention relates to a flying platform and, more particularly, to a modular flying platform.

BACKGROUND

High Altitude Platform Systems (HAPS) are the subject of different initiatives to help, for instance, deploy and maintain telecommunications services in zones that are more difficult to reach using traditional deployment technologies. Solutions that have been proposed do not appear to provide flexibility to adapt to dynamic needs. The present application aims at providing additional deployment flexibility.

SUMMARY

This summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a modular flying platform is provided that includes an airship body defining an internal space and configured to achieve buoyancy. The modular flying platform also includes an internal structure, connected to the airship body, supporting a transfer channel in the internal space. The modular flying platform also includes an attachment mechanism positioned at at least one end of the transfer channel to detachably connect with a second modular flying platform. The transfer channel is configured to permit transfer therethrough of a payload between the modular flying platform and the second modular flying platform when the second platform is securely connected. The modular flying platform also includes one or more motors mounted to the airship body towards the internal structure to control motion of the airship body.

Implementations may include one or more of the following features. The modular flying platform may include one or more telecommunications systems housed within the internal space, where at least a portion of the airship body is used as a telecommunications signal modifier. The internal structure may include a selectively sliding mechanism for transitioning between a collapsed configuration and an extended configuration to modulate an aerodynamic shape of the airship body. The airship body may further include a dynamic interconnector to modulate a collective aerodynamic shape when the modular flying platform and the second modular flying platform are securely connected. The motors may be detachably mounted. The airship body, in the internal space, may include one or more pockets dynamically filled with lighter-than-air gas. The modular flying platform may include a carousel and reservoir mechanism configured to manage the payload. The internal structure may include a central structure housing the transfer channel and the attachment mechanism and a peripheral structure providing contact points for linking at least the one or more motors. The attachment mechanism may be configured to provide one or more of an electromechanical lock and an electromagnetic lock to secure the connection. The transfer channel may be further configured to facilitate the transfer of the payload using at least one of gravity, vacuum pumps, electromagnetism and electromechanics. The modular flying platform may include one or more emergency recovery mechanisms. The modular flying platform may include an electricity generator composed of one or more of solar panels and hydrogen power cells. The transfer channel may include a launching platform to launch the payload toward space from high atmosphere.

In one general aspect, a chain of modular flying platforms is provided and each platform includes an airship body defining an internal space and configured to achieve buoyancy, an internal structure, connected to the airship body, supporting a transfer channel in the internal space and an attachment mechanism positioned at at least one end of the transfer channel to detachably connect with an another of the chain's modular flying platforms, where the transfer channel is configured to permit transfer therethrough of a payload between the modular flying platforms when securely connected. The chain may in addition include one or more motors mounted to one or more of the chain's airship bodies to control motion of the chain.

In one general aspect, a method is provided for managing a chain of modular flying platforms that includes deploying a plurality of modular flying platforms, connecting frontend and backend attachment mechanisms of the plurality of modular flying platforms to form the chain, transferring at least one payload through channels of the connected modular flying platforms and distributing at least one of propulsion, electrical power and computing across the chain.

Implementations may include one or more of the following features. The method may include dynamically reconfiguring the chain by modifying position of one or more of the plurality of modular flying platforms. The method may include launching a rocket from the chain using the channels as a launch guide.

BRIEF DESCRIPTION OF THE DRAWINGS

Further features and exemplary advantages of the present invention will become apparent from the following detailed description, taken in conjunction with the appended drawings, in which.

DETAILED DESCRIPTION

Figure 1:
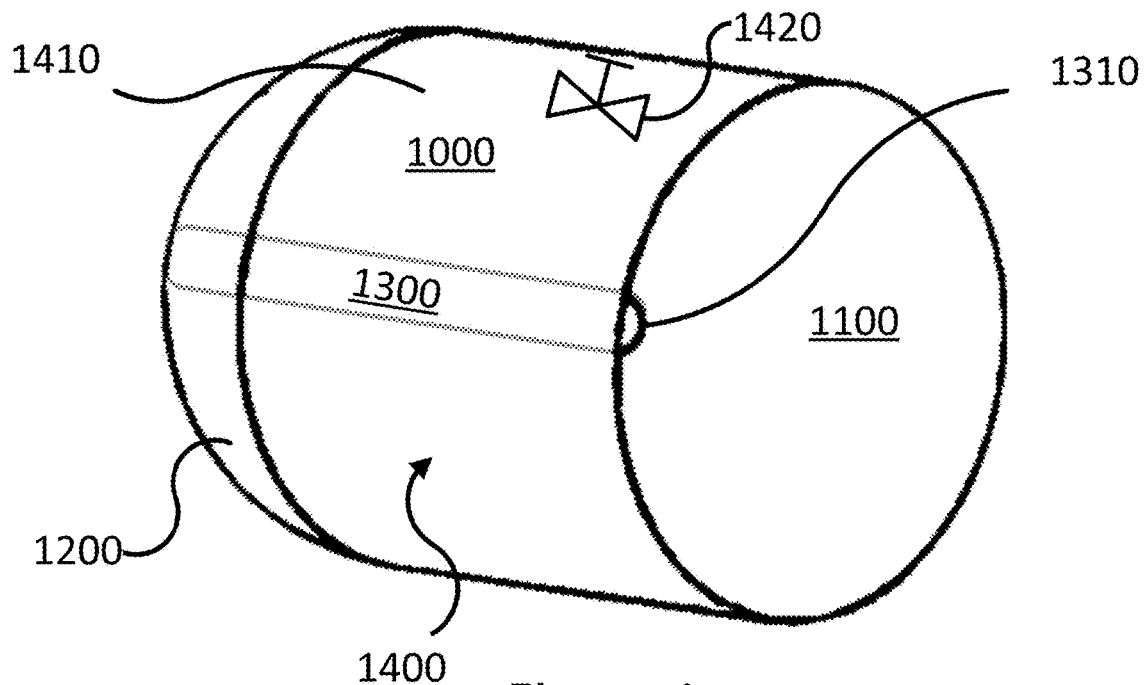
FIG. 1 is a representation of an exemplary flying platform in accordance with the teachings of the present invention.
Figure 2:
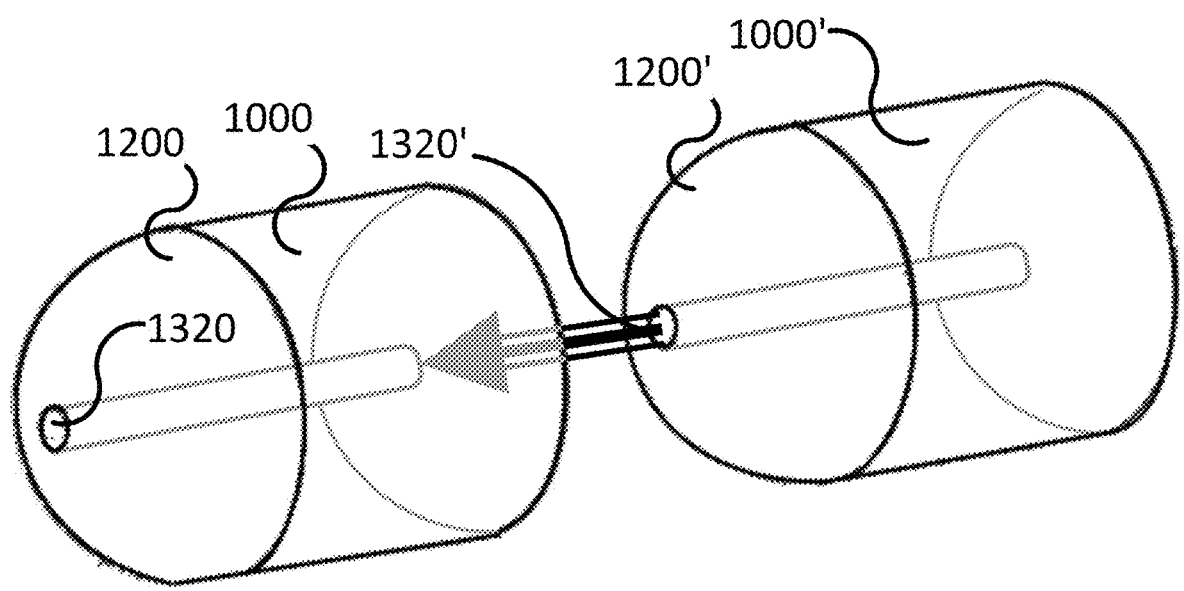
FIG. 2 is a representation of exemplary flying platforms in accordance with the teachings of the present invention.

Reference is now made to the drawings in which FIGS. 1 and 2 show representation of exemplary flying platforms 1000, 1000'. The flying platform 1000 is depicted as an airship presenting a convex frontend 1200 and a concave backend 1100. In certain embodiments, the concave backend 1100 may further be dynamically modified into a convex backend 1100'. A channel 1300 is provided between the frontend 1200 and the backend 1100. The flying platform 1000 defines an internal space 1400 therewithin, which in some embodiments, provides a volume of about 500 cubic meters. One or more pockets (not shown) within the internal space are typically filled with lighter-than-air gas to provide positive air buoyancy to the flying platform 1000. The pockets may be interconnected and/or may contain different gas, including air and/or heavier-than-air gas to support different flying configurations of the platform 1000. As persons skilled in the art will recognize, different manners of organizing the pocket(s) to provide buoyancy to the flying platform 1000 may be used without affecting the teachings presented herein.

Exemplary dimensions of the flying platform 1000 could be a ten-meter-long cylinder of eight meters in diameter with the convex frontend 1200 and the concave backend 1100 being half spheres with an eight-meter diameter. The channel 1300 may be a half meter cylinder between the convex frontend 1200 and the concave backend 1100. Skilled persons will readily be able to compute proper dimensions for the flying platform 1000 based on expected weight of the flying platform 1000 (e.g., including a selection of modules to be presented hereinafter) and expected payload weight considering buoyancy.

The channel 1300 provides a frontend attachment mechanism 1320 and a backend attachment mechanism 1310. In the depicted example, the front end 1200 and backend 1100 are compatibly shaped such that, when another flying platform 1000' approaches the flying platform 1000, the frontend attachment mechanism 1320' thereof mates with the backend attachment mechanism 1310 to secure a connection between the flying platforms 1000 and 1000' (e.g., using an electromechanical lock and/or an electromagnetic lock 1320/1320'). In some embodiments, an interconnector (not shown) may be used between the attachment mechanisms 1320', 1310. In other embodiments, the backend 1100 of the flying platform and the backend 1100' of the flying platform 1000' may be attached to one another (e.g., using an extendable mechanism from the channel 1300, which may be useful for air or flight behavior characteristics).

Figure 3:
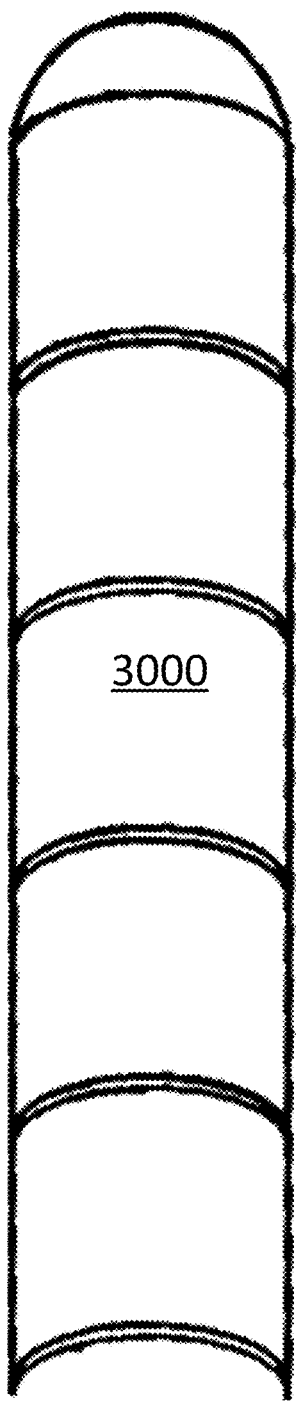
FIG. 3 a representation of chained flying platforms in accordance with the teachings of the present invention.

FIG. 3 present a chain 3000 of flying platforms, each providing similar attachments compared to 1000 and 1000', connected or interconnected to one another. In certain embodiments, the last member of the chain 3000 may be connected backend-to backend (e.g., may be useful for air or flight behavior characteristics of the chain 3000). In certain circumstances (e.g., payload, winds, space requirements, flight control limitations . . . ), it may be useful to connect all or some of the members of the chain 3000 at different altitude (e.g., on the ground; during elevation or at the target altitude).

When multiple flying platforms form a chain 3000, it is possible for different flying platform that are part of the chain, herein after referred to as members to serve different purposes or function in a cooperatively provided functionality. Examples of functions that may be wholly or partially distributed between the members include:

Electrical power (e.g., hydrogen reservoir, battery, electricity cell, solar captor . . . );

Antennas (e.g., telecommunications services);

Computing (e.g., telecommunications services);

Propulsion or motion control (e.g., motorization, control surfaces . . . )

Payload management (e.g., replacement parts, reservoirs . . . )

Inter-Platform Gas Management

The channel 1300 provides a path between the flying platforms 1000, 1000' when connected or interconnected to one another. The path may be used to transfer physical objects (e.g., a capsule through a fluid path) and/or electricity/data (through a connectivity path). The attachment mechanism 1320', 1310 may be tailored therefor. In some embodiments, the channel 1300 also provides access to the internal space 1400 inside the flying platform 1000. The internal space 1400 inside the flying platform 1000 may house different modules and the internal space 1400 may further be organized to selectively and/or fluidly connect to or with the channel 1300.

Figure 4A:
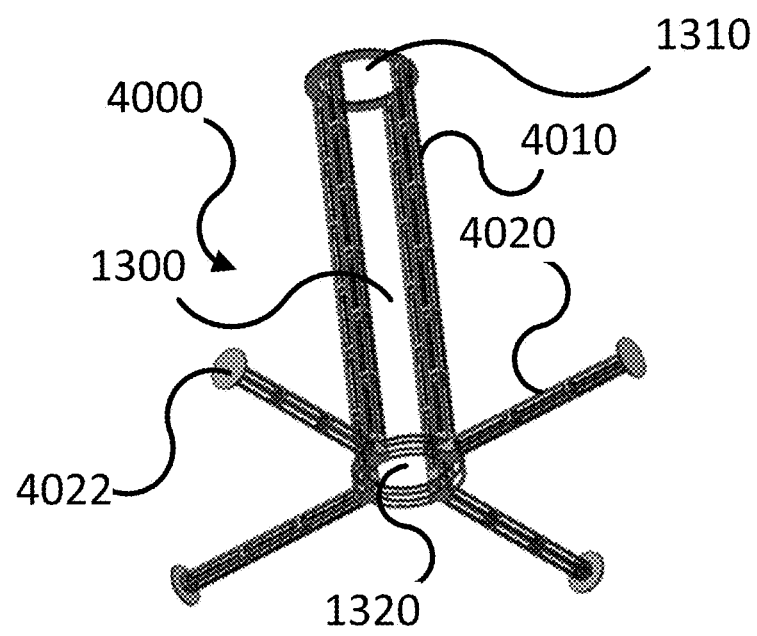
FIGS. 4A and 4B, referred to together as FIG. 4, are a representation of an exemplary internal structure of a flying platform in accordance with the teachings of the present invention.
Figure 4B:
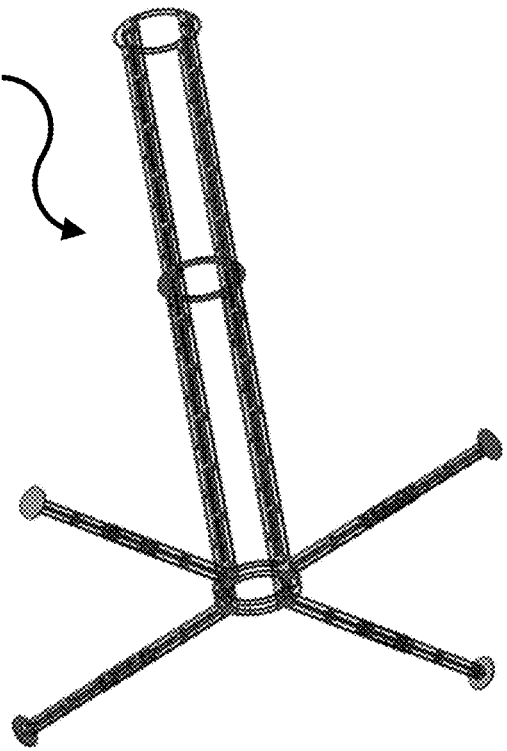

FIGS. 4A and 4B, referred to together as FIG. 4, depict an exemplary internal structure 4000 that supports the channel 1300 therethrough. On FIG. 4A, the structure 4000 is depicted in a first collapsed configuration. On FIG. 4B, the structure 4000 is depicted in a second extended configuration. In the example of FIG. 4, a central structure 4010 is formed by central sliding members (e.g., four (4) in the depicted example) while a peripheral structure 4020 is formed by peripheral sliding members (e.g., four (4) in the depicted example). Skilled persons will readily recognize that the number of sliding members may vary without affecting the teachings provided herein.

FIG. 4 shows one embodiment where the central structure 4010 and the peripheral structure 4020 are normal (perpendicular) to one another. The central structure 4010 links both attachments mechanisms 1310, 1320. The peripheral structure 4020 provides contact points 4022 that are configured to ultimately connect the internal structure 4000 therewith. The contact points 4022 may also be configured to directly or indirectly mechanically link motors 4023 provided outside of an exterior skin of the flying platform 1000.

The motors may be provided as fixed motors (e.g., mounted on gimbals). Alternatively, or additionally, the motors may be provided as independent flying machines that are configured to selectively detachably attach to the flying platform 1000. In some embodiments, the motors may be mounted on gimbals made with 2 step motors thereby allowing a full 360 degrees of rotation in two axis allowing a spherical vectored thrust. A pitch variable propeller may be used to optimize energy consumption at low speed and high speed.

Figure 8:
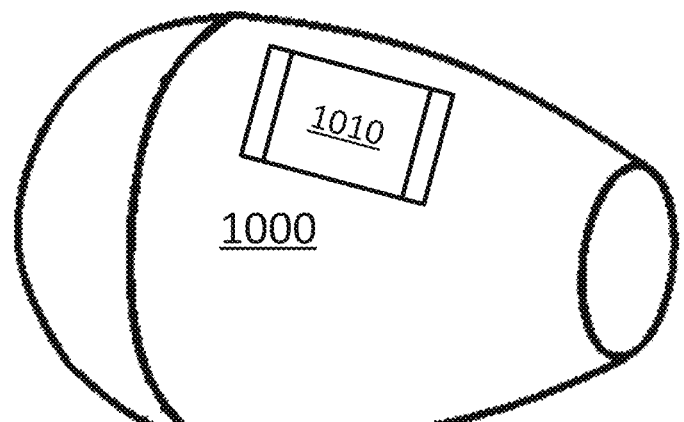
FIG. 8 is a representation of a flying platform in a different backend configuration in accordance with the teachings of the present invention.
Figure 9:
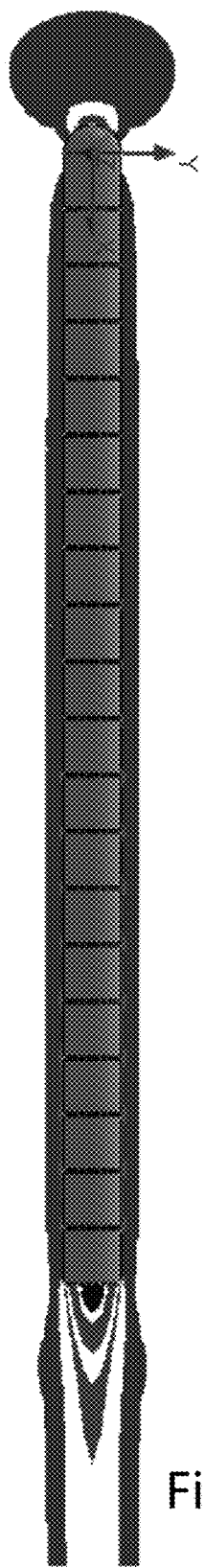
FIG. 9 is a representation of drag generated by a train of flying platforms in accordance with the teachings of the present invention.
Figure 10:
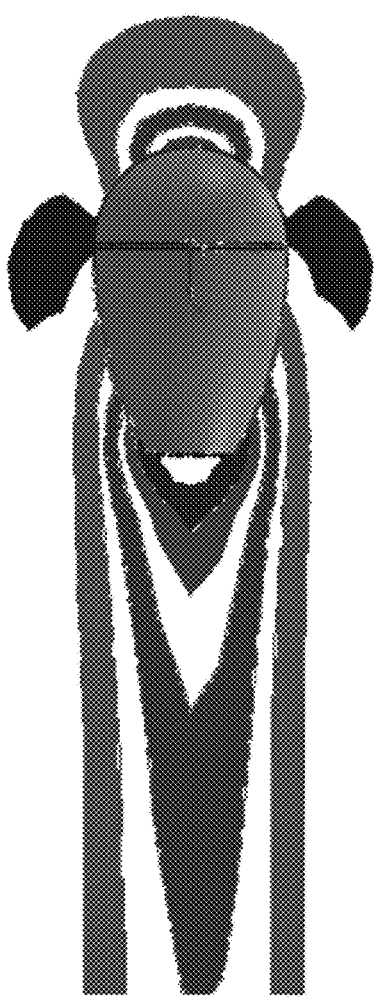
FIG. 10 is a representation of drag generated by a flying platform in a first backend configuration in accordance with the teachings of the present invention.
Figure 11:
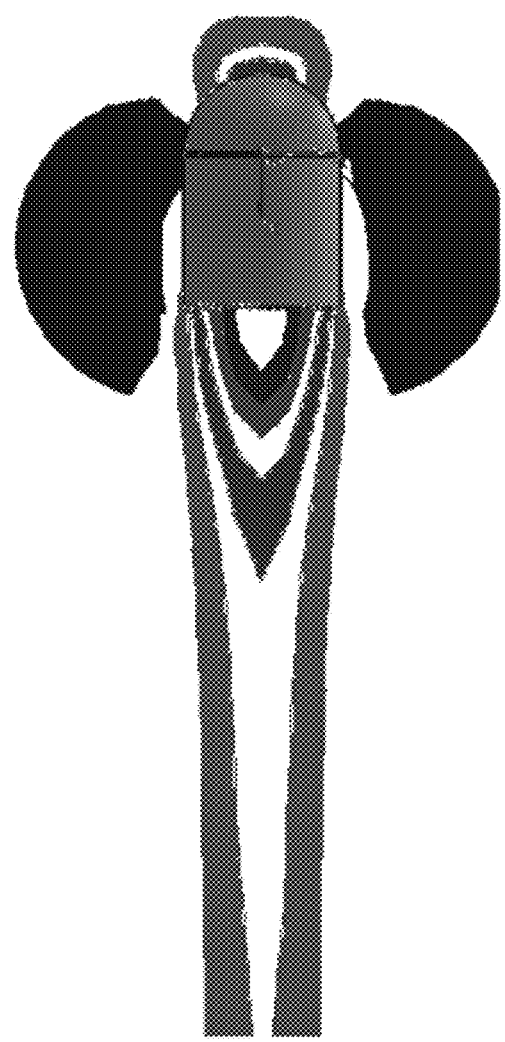
FIG. 11 is a representation of drag generated by a flying platform in a second backend configuration in accordance with the teachings of the present invention.

The exterior skin of the flying platform 1000 is adapted to dynamically extend and/or retract when the internal structure 4000 changes configuration. Furthermore, only one of the central structure 4010 and the peripheral structure 4020 may change configuration. Intermediate points of extension or retraction may also be determined. In some embodiments, the configuration of the central structure 4010 and the peripheral structure 4020 is fixed before the exterior skin is provided to the flying platform 1000. FIG. 8 provides a depiction of the flying platform 1000 in a different configuration with a backend of much smaller diameter, which may be useful to reduce drag, as can be seen from the diagrams of FIGS. 9, 10 and 11.

Figure 5A:
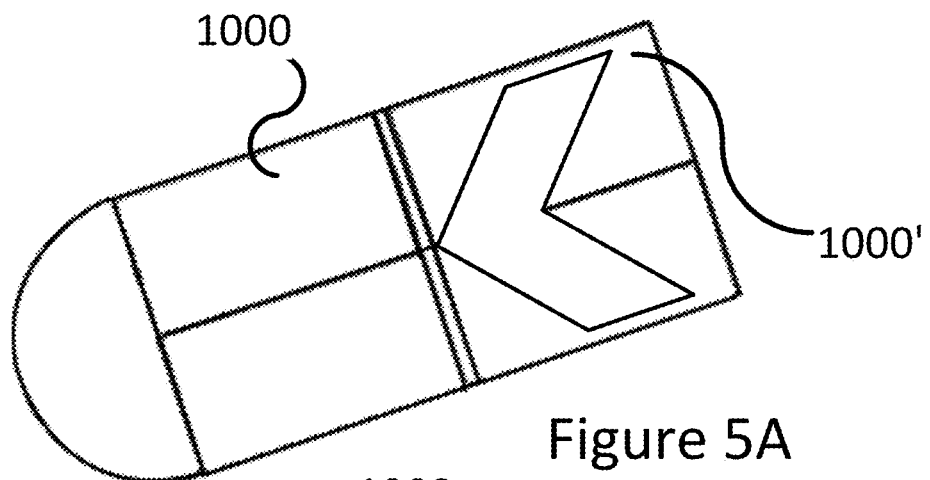
FIGS. 5A and 5B, referred to together as FIG. 5, are representation of chained flying platform using gravity in accordance with the teachings of the present invention.
Figure 5B:
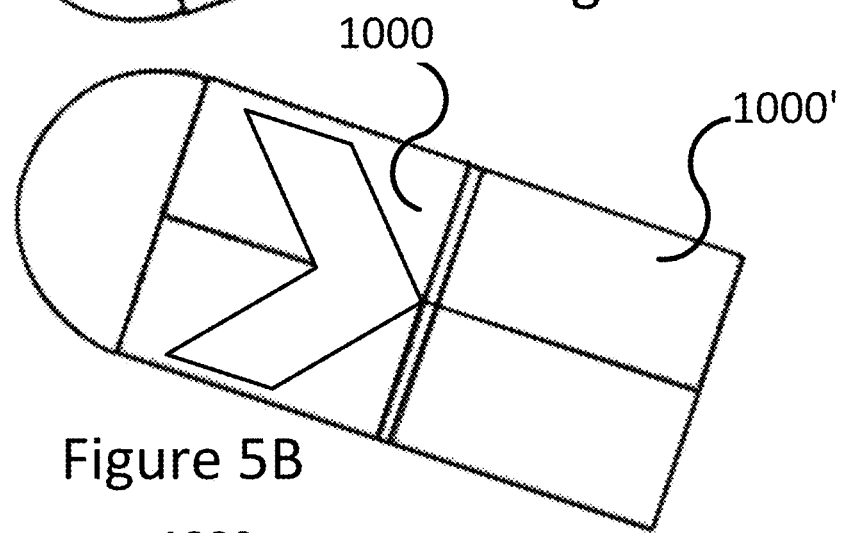

As depicted on FIGS. 5A and 5B, referred to together as FIG. 5, gravity may be used to cause a payload (e.g., an object, a capsule or the likes) to slide via the channel 1300, 1300' between connected flying platforms 1000, 1000' from a higher one to a lower one. The channel 1300 may also provide railings and/or other guiding mechanisms (not shown) to facilitate movement of the object. Alternatively, or additionally, an active force may also be exerted on the object while in the channel 1300 to either assist or replace the gravitational transfer. Example of additional and/or alternate mechanisms include vacuum pumps and contact spinners.

FIG. 5 only shows two flying platforms 1000, 1000', but a larger number of platforms may be interconnected without affecting the teachings found herein. Likewise, more than one transfer in the same direction may be performed at once. In order to adequately control the transfer of payload through the channel 1300, a ceasing mechanism (not shown) may be provided at one or more position over the channel 1300. An example of the ceasing mechanism includes a localized channel-deformation device providing additional friction (e.g., localized smaller diameter) within the channel 1300, which may be configured to control the speed and/or stop the payload transiting through the channel 1300. Another example of the ceasing mechanism is a movable plate that selectively (completely or partially) blocks the channel 1300 for the same purpose of controlling the speed and/or stopping the payload transiting through the channel 1300. Some flying platforms 1000 may be equipped with permanent front and/or back stoppers (e.g., as terminal members at both ends of a chain).

Figure 6:
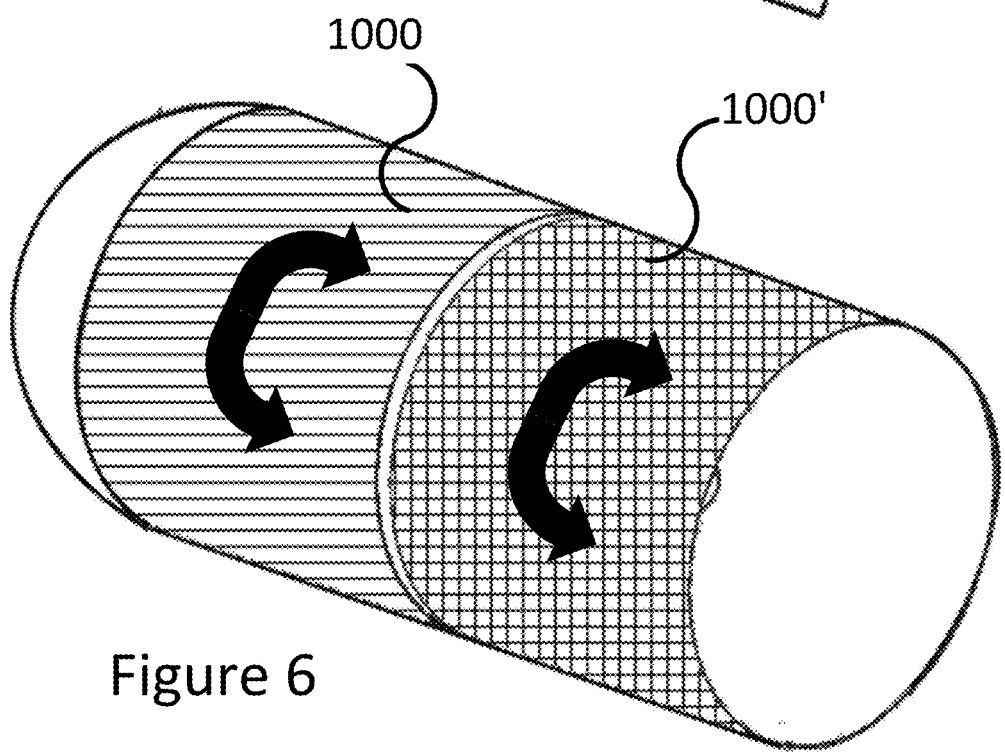
FIG. 6 is a representation of chained flying platform having a rotational degree of freedom in accordance with the teachings of the present invention.

FIG. 6 illustrates a rotational degree of freedom that may be provided by some embodiments where the flying platforms 1000, 1000' may longitudinally rotate independently from one another. For instance, the frontend 1200 may be fixably engaged with the channel 1300 while the backend 1100 is rotatable therearound or vice-versa. With the example of internal structure 4000, the contact points 4022 may fixably attached to either ends 1100, 1200 while the remaining of the two ends 1100, 1200 is rotatably linked (not shown) to the central structure 4010.

Figure 7A:
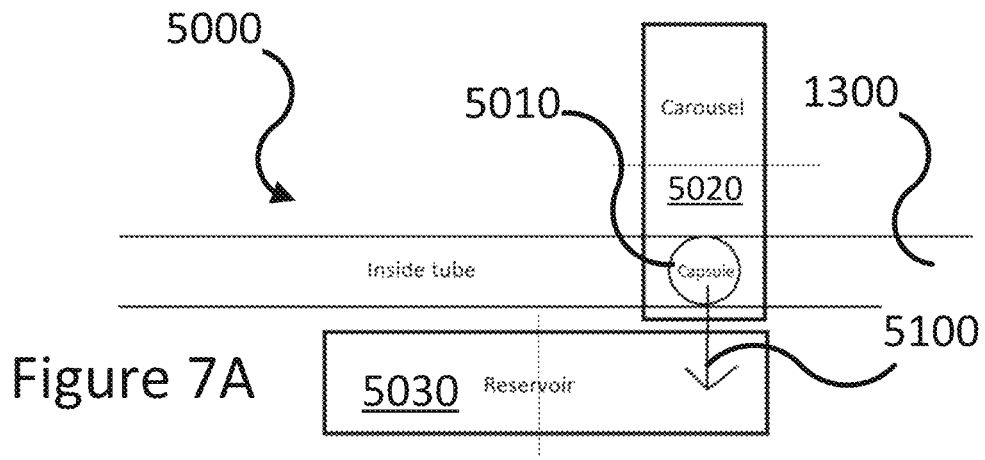
FIGS. 7A and 7B, referred to together as FIG. 7, are representations of a carousel and reservoir mechanism in accordance with the teachings of the present invention.
Figure 7B:
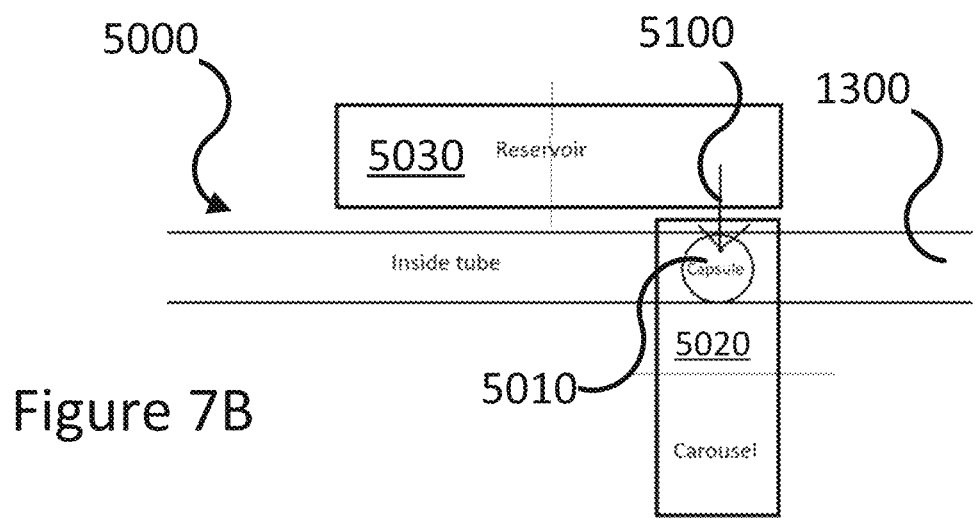

FIGS. 7A and 7B, referred to together as FIG. 7, provide an example of mechanism 5000 whereby a capsule 5010 may be transferred 5100 from a carousel 5020 to a reservoir 5030 (FIG. 7A) and, through rotation of the mechanism 5000 around the channel 1300 from the reservoir 5030 to the carousel 5020. The mechanism 5000 is configured to selectively position a payload in the channel 1300 and to selectively remove a payload from the channel 1300. The payload may be encapsulated during the transfer. The capsule may have various shapes, including a sphere or a rounded cylinder. In order to exchange capsules, the mechanism 5000 may be configured to be handle to two or more capsules. Examples of payloads include element for networking, computing, sensing and energy. The mechanism 5000 may also comprise a release module to manipulate the payload from the capsules. Depending on the payload, the release module may further be configured to deploy the payload in or on the flying platform 1000. In certain embodiments, deployment of the payload may be performed by positioning the payload in a powered compartment configured to receive one specific payload or many various payloads using a common interface. The release module may also be configured to decommission a payload (e.g., remove from a compartment, change from an active compartment to a parking compartment, insert the decommissioned payload in a capsule, etc.).

Figure 12:
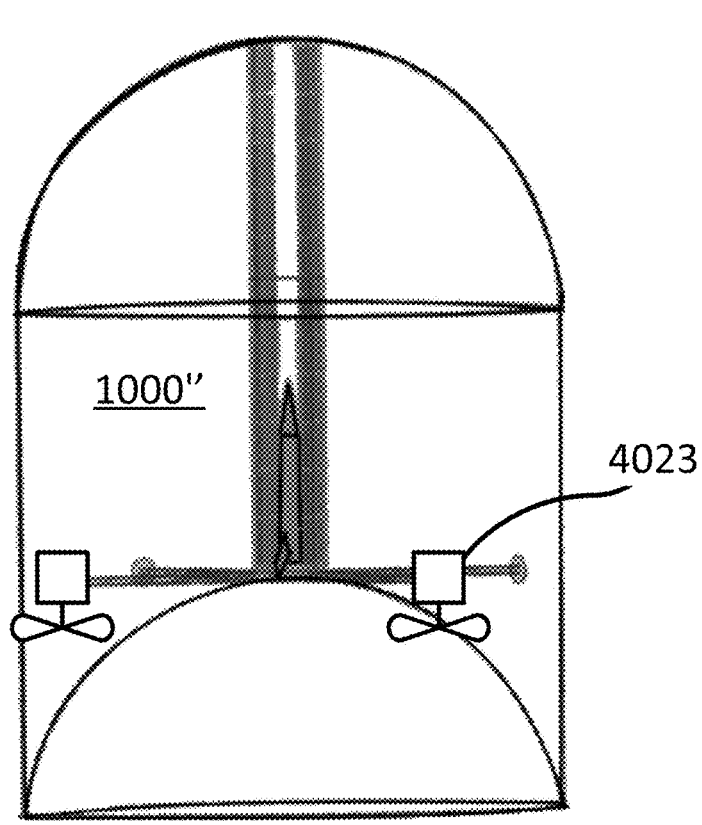
FIG. 12 is a representation of a flying platform used as a launch platform in accordance with the teachings of the present invention.
Figure 13:
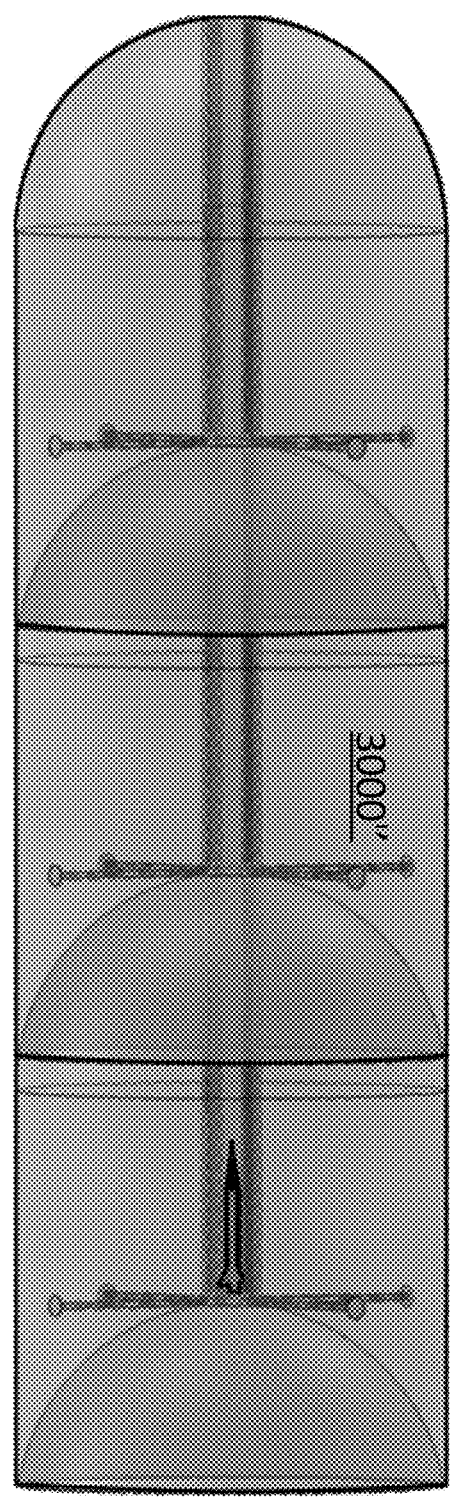
FIG. 13 is a representation of a train of flying platforms used as a launch platform in accordance with the teachings of the present invention.

FIG. 12 shows the use of a flying platform 1000" as a launch platform for a rocket through the channel 1300 mounted in the internal structure 4000. The flying platform 1000" may be specifically modified to take a role of launch platform considering related demands (e.g., different materials . . . ). FIG. 13 shows the use of a chain of flying platforms as a launch platform 3000" for a rocket through the connected channels of the chain mounted in the internal structure 4000. One or more of the launch platform's (or chain's) 3000" members may be specifically modified to take a role of launch platform considering related demands. By connecting several flying platforms together, it is expected that the precision of the launch may be increased. In certain embodiments, the channel 1300 is open and the rocket is launch as conventional rocket launchers. Alternatively, the channel 1300 may be closed in order to use the gas from the propulsion to increase the speed of the rocket. By using the modularity of the flying platform, different stages of a bigger rocket may be lifted using different flying platforms and assemble once a chain is formed from the different flying platforms. A small first stage for the rockets may be used to get the rocket off the channel 1300 and a bigger second stage may then be ignited once the rocket reached a sufficient distance to control or avoid damages to the flying platform 1000". Another option may be to mechanically push the rocket outside the channel 1300 before ignition thereof (e.g., using a coil, using pressure of a hydrogen tank, . . . ).

Depending on the power dissipation needed with the launch of the rockets, a rockoon may be integrated in the channel 1300 with a backward extension so that the ignition of the rocket occurs outside of the flying platform.

Safety measures may be added such as a safety detachment mechanism to allow detachment of a flying platform from a chain in case of damage (e.g., from the rocket launch or otherwise). A parachute may be provided as an additional or alternate safety measure.

Figure 14:
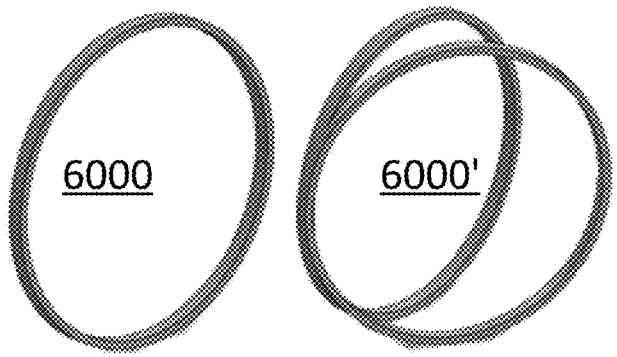
FIGS. 14A and 14B, referred to together as FIG. 14, are representations of a interconnectors in accordance with the teachings of the present invention.

FIG. 14 shows interconnectors 6000 and 6000', which may be positioned in a chain of members to provide different forms thereto (e.g., forming a tore or other three-dimensional structures that may be useful for different purposes). The interconnectors 6000 and 6000' may be fixed or may represent different configurations of a single dynamic interconnector.

In some implementations, the flying platform 1000 may use electricity generators such as solar panels 1010 to collect electricity and store the collected electricity in one or more batteries and one or more hydrogen bottles or tanks (e.g., hydrogen bottles movable as payload). In some embodiments, the flying platform 1000 may further function as a closed loop fuel cell system to generate hydrogen from the water by using the electricity from the solar panels. Furthermore, energy can be transferred between flying platforms, e.g., using hydrogen bottle(s) and/or batteries. In one potential use of energy transfer between flying platforms (e.g., by providing more hydrogen bottle), a flying platform may be provided with additional energy, which may be used to execute additional tasks.

In certain embodiments, the flying platform 1000 may have the role of cleaning the buoyancy gas of other airship.

In certain embodiments, the flying platform 1000 may transport one or more type of antenna. Furthermore, the antennas may be configured for deployment outside and/or inside the flying platform 1000. Outside antennas may be fixed on an outer shell flying platform 1000. The outside antenna may therefore be selectively rotated (e.g., for dynamically adjusting orientation). Alternatively or additionally, one or more rotating mounts may be provided outside the flying platform, which may be used to increase the degrees of freedom in positioning antennas. Alternatively, or additionally, the outside antennas may also be equipped with autonomous propulsion systems to change position on the flying platform.

Inside antennas may be deployed and decommissioned as payload and further exchanged between members of a chain using the channel 1300. Specific compartments or generic compartments may be used to deploy antennas in the flying platform 1000.

In certain embodiments, once two flying platforms 1000, 1000' are connected, a direct transfer of gas (e.g., buoyancy or combustible) may be done (e.g., through a telescopic pipe inside the channel 1300). The direct transfer of gas may therefor be performed faster than through the transfer of hydrogen bottles. The direct transfer may also allow for more efficient balancing of gas between the flying platforms (e.g., to balance a chain).

In certain embodiments, transmission of signal may be provided from one or more flying platforms and the surface thereof may be built with reflective properties. The reflective surface may be provided as an envelope over the flying platform, the surface of the flying platform itself or, when the skin of the flying platform is transparent to the reflected signals, the reflective surface may be deployed inside the flying platform (e.g., as a payload). In certain configurations, a chain of reflective flying platforms may form a ring around a central flying platform, thereby providing the characteristics of a parabola.

The flying mechanism may be equipped with one or more recovery system 1420 (e.g., normal operation and emergency recovery). In normal operation, the recovery may be performed by changing the buoyancy of the flying platform (e.g., opening a valve on the top of the flying platform, by filling a pocket inside the flying platform with outside air, by compressing the lighter-than-air gas into a tank, . . . ). The purpose of a normal operation recovery is to controllably get the flying platform lower or on the ground. When a small leak of gas is discovered, a similar approach may be used. Motors mounted on the flying platform may possibly be used to control the recovery.

In case of a bigger leakage or rupture of the envelope of the flying platform which result to a free or quasi-free fall, an emergency parachute may be deployed from the internal structure through the channel 1300. Once the parachute is deployed, motors mounted on the flying platform may possibly be used to control the descent.

The flying platform may be configured to be deployed at or around a 20 km altitude. However, transportation of merchandise in lower altitude may also be provided thereby. One possible low altitude use is to deploy a chain of flying platforms (e.g., from a warehouse) that eventually controllably split up (e.g., to deliver packages individually or in smaller groups) before reforming the chain on the way back. The chain may therefore be ordered and the delivery path may be optimized considering characteristics of the mission of the flying platforms (e.g., delivery of packages with known characteristics at known destinations). Underwater platforms may be developed using similar procedures.

Figure 15:
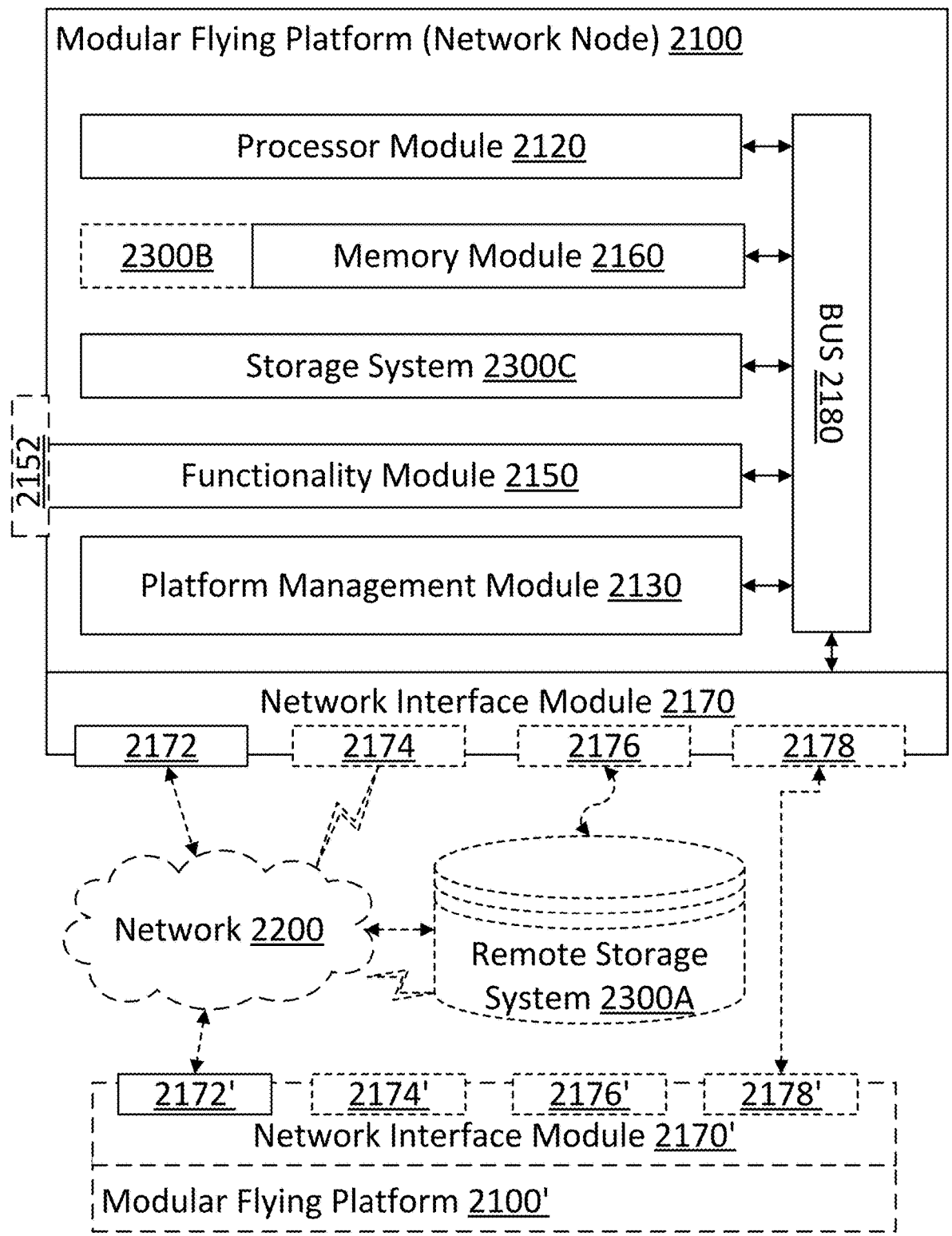
FIG. 15 is a logical modular representation of an exemplary network node deployed in a system in accordance with the teachings of the present invention.

FIG. 15 shows a logical modular representation of an exemplary system 2000 comprising a modular flying platform (as a network node deploying one or more telecommunications system) 2100. The modular flying platform 2100 comprises a memory module 2160, a processor module 2120, a platform management module 2130 and a network interface module 2170. The modular flying platform 2100 may also include a functionality module 2150.

The system 2000 may comprise a storage system 2300 for storing and accessing long-term (i.e., non-transitory) data and may further log data while the modular flying platform 2100 is being used. FIG. 1 shows examples of the storage system 2300 as a distinct database system 2300A, a distinct module 2300C of the modular flying platform 2100 or a sub-module 2300B of the memory module 2160 of the modular flying platform 2100. The storage system 2300 may be distributed over different systems A, B, C. The storage system 2300 may comprise one or more logical or physical as well as local or remote hard disk drive (HOD) (or an array thereof}. The storage system 2300 may further comprise a local or remote database made accessible to the modular flying platform 2100 by a standardized or proprietary interface or via the network interface module 2170.

The network interface module 2170 represents at least one physical interface that can be used to communicate with other modular flying platforms. The network interface module 2170 may be made visible to the other modules of the modular flying platform 2100 through one or more logical interfaces. The actual stacks of protocols used by the physical network interface(s) and/or logical network interface(s) 2172-2178 of the network interface module 2170 do not affect the teachings of the present invention.

The processor module 2120 may represent a single processor with one or more processor cores or an array of processors, each comprising one or more processor cores. The memory module 2160 may comprise various types of memory (different standardized or kinds of Random Access Memory (RAM) modules, memory cards, Read-Only Memory (ROM) modules, programmable ROM, etc.).

A bus 2180 is depicted as an example of means for exchanging data between the different modules of the modular flying platform 2100. The teachings presented herein are not affected by the way the different modules exchange information. For instance, the memory module 2160 and the processor module 2120 could be connected by a parallel bus, but could also be connected by a serial connection or involve an intermediate module (not shown) without affecting the teachings of the present invention.

An platform management module 2130 provides platform management-related services to the modular flying platform 2100, which will be described in more details hereinbelow.

The variants of processor module 2120, memory module 2160 and network interface module 2170 usable in the context of the present invention will be readily apparent to persons skilled in the art. Likewise, even though explicit mentions of the platform management module 2130, the memory module 2160, the functionality module 2150 and/or the processor module 2120 are not made throughout the description of the present examples, persons skilled in the art will readily recognize when such modules are used in conjunction with other modules of the modular flying platform 2100 to perform routine as well as innovative elements presented herein.

Various network links may be implicitly or explicitly used in the context of the present invention. While a link may be depicted as a wireless link, it could also be embodied as a wired link using a coaxial cable, an optical fiber, a category 5 cable, and the like. A wired or wireless access point (not shown) may be present on the link between. Likewise, any number of routers (not shown) may be present and part of the link, which may further pass through the Internet.

The present invention is not affected by the way the different modules exchange information between them. For instance, the memory module and the processor module could be connected by a parallel bus, but could also be connected by a serial connection or involve an intermediate module (not shown) without affecting the teachings of the present invention.

A method is generally conceived to be a self-consistent sequence of steps leading to a desired result. These steps require physical manipulations of physical quantities. Usually, though not necessarily, these quantities take the form of electrical or magnetic/electromagnetic signals capable of being stored, transferred, combined, compared, and otherwise manipulated. It is convenient at times, principally for reasons of common usage, to refer to these signals as bits, values, parameters, items, elements, objects, symbols, characters, terms, numbers, or the like. It should be noted, however, that all of these terms and similar terms are to be associated with the appropriate physical quantities and are merely convenient labels applied to these quantities. The description of the present invention has been presented for purposes of illustration but is not intended to be exhaustive or limited to the disclosed embodiments. Many modifications and variations will be apparent to those of ordinary skill in the art. The embodiments were chosen to explain the principles of the invention and its practical applications and to enable others of ordinary skill in the art to understand the invention in order to implement various embodiments with various modifications as might be suited to other contemplated uses.

What is claimed is:

1. A modular flying platform comprising:
   an airship body defining an internal space and configured to achieve buoyancy;
   an internal structure, connected to the airship body, supporting a transfer channel in the internal space;
   an attachment mechanism positioned at at least one end of the transfer channel to detachably connect with a second modular flying platform, wherein the transfer channel is configured to permit transfer therethrough of a payload between the modular flying platform and the second modular flying platform when the second platform is securely connected; and
   one or more motors mounted to the airship body towards the internal structure to control motion of the airship body.

2. The modular flying platform of claim 1, further comprising one or more telecommunications systems housed within the internal space, wherein at least a portion of the airship body is used as a telecommunications signal modifier.

3. The modular flying platform of claim 1, wherein the internal structure comprises a selectively sliding mechanism for transitioning between a collapsed configuration and an extended configuration to modulate an aerodynamic shape of the airship body.

4. The modular flying platform of claim 1, wherein the airship body further comprises a dynamic interconnector to modulate a collective aerodynamic shape when the modular flying platform and the second modular flying platform are securely connected.

5. The modular flying platform of claim 1, wherein the motors are detachably mounted.

6. The modular flying platform of claim 1, wherein the airship body, in the internal space, comprises one or more pockets dynamically filled with lighter-than-air gas.

7. The modular flying platform of claim 1, further comprising a carousel and reservoir mechanism configured to manage the payload.

8. The modular flying platform of claim 1, wherein the internal structure includes:
   a central structure housing the transfer channel and the attachment mechanism; and
   a peripheral structure providing contact points for linking at least the one or more motors.

9. The modular flying platform of claim 1, wherein the attachment mechanism is configured to provide one or more of an electromechanical lock and an electromagnetic lock to secure the connection.

10. The modular flying platform of claim 1, wherein the transfer channel is further configured to facilitate the transfer of the payload using at least one of gravity, vacuum pumps, electromagnetism and electromechanics.

11. The modular flying platform of claim 1, further comprising one or more emergency recovery mechanisms.

12. The modular flying platform of claim 1, further comprising an electricity generator composed of one or more of solar panels and hydrogen power cells.

13. The modular flying platform of claim 1, wherein the transfer channel comprises a launching platform to launch the payload toward space from high atmosphere.

14. A chain of modular flying platforms, each platform comprising:
   an airship body defining an internal space and configured to achieve buoyancy;
   an internal structure, connected to the airship body, supporting a transfer channel in the internal space; and
   an attachment mechanism positioned at at least one end of the transfer channel to detachably connect with a another of the chain's modular flying platforms, wherein the transfer channel is configured to permit transfer therethrough of a payload between the modular flying platforms when securely connected; and
   wherein one or more motors are mounted to one or more of the chain's airship bodies to control motion of the chain.

15. A method of managing a chain of modular flying platforms comprising:
   deploying a plurality of modular flying platforms;
   connecting frontend and backend attachment mechanisms of the plurality of modular flying platforms to form the chain;

transferring at least one payload through channels of the connected modular flying platforms; and distributing at least one of propulsion, electrical power and computing across the chain.

16. The method of claim 15, further comprising dynamically reconfiguring the chain by modifying position of one or more of the plurality of modular flying platforms.

17. The method of claim 15, further comprising launching a rocket from the chain using the channels as a launch guide.

* * * * *